United States Patent [19]

Takaoka et al.

[11] Patent Number: 4,540,897
[45] Date of Patent: Sep. 10, 1985

[54] DIGITAL MODULATION SIGNAL READING DEVICE

[75] Inventors: Saburo Takaoka; Ryuichi Naito; Fumihiko Yokogawa; Youichi Ogawa, all of Saitama, Japan

[73] Assignee: Pioneer Electronic Corporation, Tokyo, Japan

[21] Appl. No.: 507,645

[22] Filed: Jun. 27, 1983

[30] Foreign Application Priority Data

Jun. 25, 1982 [JP] Japan .................. 57-109336

[51] Int. Cl.³ .............................................. H03K 5/08
[52] U.S. Cl. .................................. 307/268; 328/164; 375/76
[58] Field of Search .............. 329/104, 106, 107, 126, 329/131, 133; 375/25, 26, 34, 58, 76, 4; 307/260, 261, 268; 328/164

[56] References Cited

U.S. PATENT DOCUMENTS

| 4,339,727 | 7/1982 | Kage et al. ................ 375/76 X |
| 4,406,988 | 9/1983 | Scholz ...................... 328/164 X |

FOREIGN PATENT DOCUMENTS

| 0063443 | 10/1982 | European Pat. Off. .......... 307/268 |
| 56-156053 | 12/1981 | Japan ........................... 328/164 |

*Primary Examiner*—Siegfried H. Grimm
*Attorney, Agent, or Firm*—Sughrue, Mion, Zinn, Macpeak, and Seas

[57] ABSTRACT

A data reading device for reading out data modulated according to a system wherein the time ratio of low to high level signals is substantially unity employs a time ratio detector and an intermediate level detector. A comparator compares the reproduced output level with a synthesized signal which may represent a combination of the outputs of the time ratio detector and the intermediate level detector.

6 Claims, 15 Drawing Figures

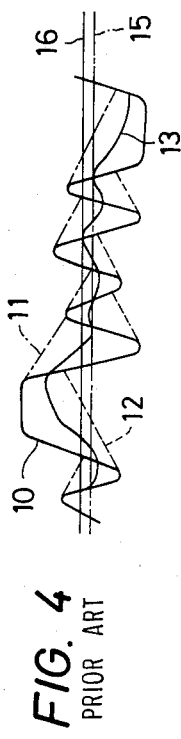
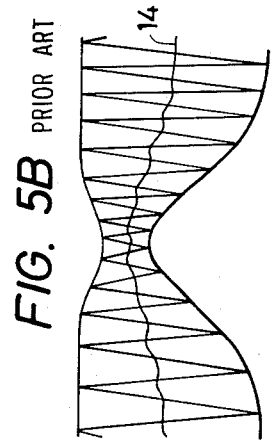
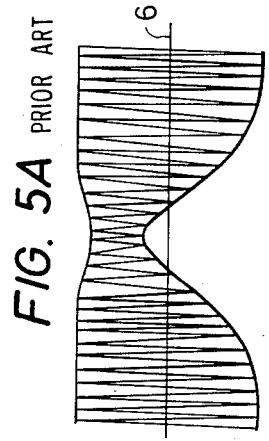
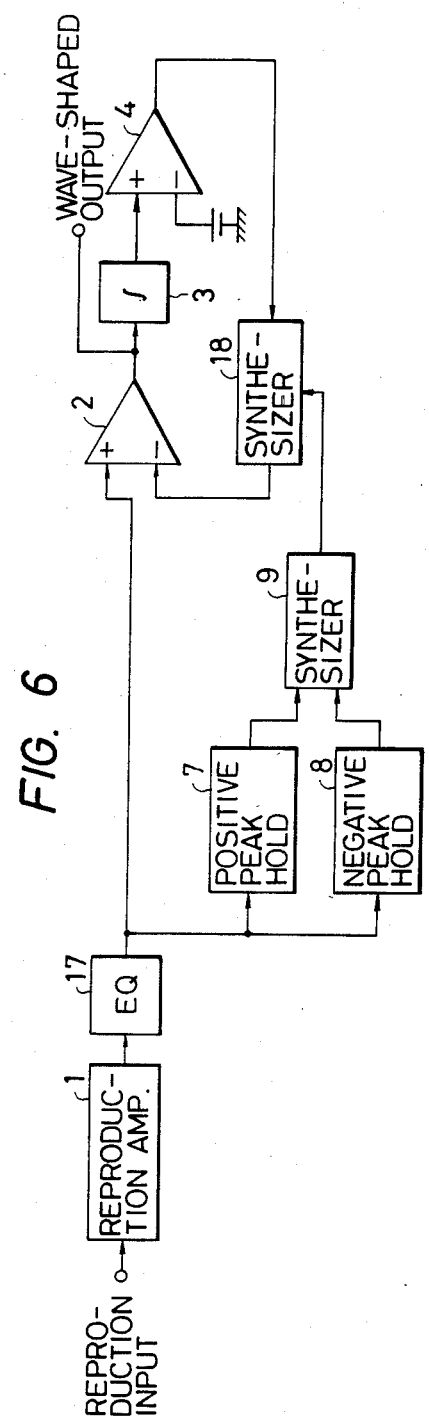
FIG. 4 PRIOR ART
FIG. 5A PRIOR ART
FIG. 5B PRIOR ART
FIG. 6

DIGITAL MODULATION SIGNAL READING
DEVICE

BACKGROUND OF THE INVENTION

The present invention relates to a digital modulation signal reading device, and, particularly to a reading device for use in the reproduction of digital information whose PCM (pulse code modulation) signal is recorded on a recording medium or transmitted into a transmission medium according to a modulation system in which the time ratio of the high level signal duration to the low level signal duration within a unit time is substantially unity.

In recording a digital information signal such as a PCM signal on a recording medium, predetermined modulation is performed. In examples of modulation systems usable for this purpose, the time ratio of the high level signal duration to the low level signal duration within a unit time is substantially unity. According to this modulation system, there is an advantage in that the reproduced output has no direct current component. With the reproduction of such signals, a reproduced RF (radio frequency) signal from the pickup takes the form of a distorted sinusoidal wave due to the finite frequency characteristics of the pick-up or the recording medium. In order to wave-shape such a distorted waveform into a rectangular waveform, the so-called zero level comparison system including a level comparator has been used.

In an optical recording and reproducing system using an optical recording disc in which the existence or absence of a pit are made correspondent to low and high levels of a digital modulation signal, respectively, and such high and low levels are optically read out, the binary level is detected by detecting the amount of irradiating light reflected from the disc, and therefore the peak values of the high and low levels of a reproduced signal cannot be symmetrical (See FIG. 2b). Even if the reproduced level is compared with a constant comparison level (zero level) in a level comparator, it is impossible to obtain the exact original digital information.

In order to resolve this problem, it has been usual, as shown in FIG. 1, to detect the current component contained in the output of the level comparator 2, which acts to wave-shape an output of the reproduction amplifier 1, by using an integrator 3, to obtain an output corresponding to the direct current component from a differential amplifier 4. The latter output is used as the comparison level in the level comparator 2. That is, when the d.c. component contained in the output of the level comparator 2 increases in a positive direction, the time duration of the high level to that of the low level of the comparison output can be made equal by correspondingly increasing the comparison level of the comparator 2, since the high level time duration of the reproduction input is longer than the other. On the other hand, when the d.c. component in the comparison output increases in the negative direction, it is compensated by lowering the comparison level of the comparator 2 correspondingly. A circuit performing such an operation is referred to as an ATC (automatic threshold control) circuit and is disclosed in detail in (Japanese) patent application No. 56-215207 filed on Dec. 25, 1981 applied for by the present applicant.

FIG. 2a shows a recording signal waveform to be supplied to a recording medium according to the EFM (eight to fourteen modulation) system in which the time ratio of the high level to the low level is made substantially equal to unity. The FIG. 2b waveform is the reproduced waveform when the recording signal indicated by the FIG. 2a waveform is picked up and reproduced. The FIG. 2b waveform is a distorted sinusoidal wave whose positive and negative peaks are symmetrical to each other with respect to a zero level 5. The FIG. 2c waveform is a comparison output obtained by level comparison of the FIG. 2b waveform with the zero level 5, and is still different from the original signal of FIG. 2a, i.e., it is not an exact reproduction output. By supplying the FIG. 2b waveform to the ATC circuit in FIG. 1, the comparison level of the comparator 2 is automatically controlled as shown by a chain line 6, resulting in the same waveform as the waveform a being reproduced.

In this circuit system, the time constant of the integrator 3 functioning to detect the time ratio is necessarily large because this system utilizes the fact that the time ratio of the high level to the low level of the modulation signal is substantially unity over a long time basis. Therefore, the comparison level (threshold level) of the level comparison 2 cannot trace a level reduction phenomenon due to instantaneous drop out, etc. as shown by the straight line 6 in FIG. 5A. Consequently, a non-data section may be produced.

(Japanese) Patent Application Laid-Open No. 55-150644 laid-open for public inspection on Nov. 22, 1980 (no full examination has been requested) discloses a circuit system whose trace characteristic is improved by making the time constant of the ATC circuit smaller. FIG. 3 shows the circuit system schematically. The signal from the reproduction amplifier 1 is compared in the level comparator 2 with a predetermined comparison level as in the case of the circuit in FIG. 1. As the comparison level, an output of a synthesizer 9 is used which is obtained by, for example, summing therein outputs of peak hold circuits 7 and 8 which hold the positive and negative peak values of the reproduction signal, respectively, in an appropriate ratio.

In the case of a reproduction signal such as shown by curve 10 in FIG. 4, the positive and negative peak hold outputs become as shown by the chained curves 11 and 12, respectively, and an intermediate level between the positive and negative peaks, which is obtained by the adder 9, becomes as shown by curve 13.

In this circuit system, the time constants of the peak hold circuits 7 and 8 are very small compared with that of the circuit of FIG. 1, and thus the response time of the threshold level is shorter. Further, in the case of drop-out, the threshold level 14 changes as shown in FIG. 5B, causing no non-data section. When this system is used to wave-shape the reproduction signal from a recording medium having the asymmetry shown in FIG. 2b, however, there may be defects in normal operation, which will be described below.

That is, when the time constants of the peak hold circuits are made small enough to be capable of tracing the respective peaks of the signal, there is no level variation due to drop out, etc. when the amplitude of the reproduced RF signal 10 varies as shown in FIG. 4. However, the threshold level always varies as shown by curve 13 and is astable. Further since the threshold level 13 intersects with the RF signal 10 at points deviated from the real threshold level 15, it is impossible to obtain an exact reproduction waveform. On the other hand, when the time constants of the respective positive and negative peak hold circuits are made large enough to be capable of tracing in the drop out case while not capable of tracing the RF signal peaks, the threshold level becomes a line passing through the intermediate values of the respective peaks. A solid line 16 in FIG. 4 shows the latter case, which differs from the true threshold level 5, resulting in that exact reproduction is still impossible.

SUMMARY OF THE INVENTION

An object of the present invention is to provide a digital modulation signal reading device which is always capable of providing a stable reproduction output regardless of level variations such as drop out, etc. originating in a recording medium or transmission system.

The digital modulation signal reading device according to the present invention controls the comparison level (i.e. the threshold level) of the level comparator of an ATC circuit in response to the time ratio of the high level to the low level appearing in a comparison output, and in response to the intermediate levels of respective positive and negative peaks of a reproduction signal.

Another digital modulation signal reading device according to the present invention uses as an input signal to the level comparator of the ATC circuit, a reproduction signal whose offset is controlled according to the intermediate levels of the respective peak values of the reproduction signal, and controls the comparison level according to the time ratio of the high level to the low level of the output of the level comparator.

BRIEF DESCRIPTION OF THE DRAWINGS

FIG. 4 is a waveform diagram for an explanation of the operation of the circuit of FIG. 3;

FIGS. 5A and 5B show the operational waveforms when the circuit in FIG. 1 (and/or) FIG. 3 experiences a drop-out;

FIG. 6 is a circuit diagram of an embodiment of the present invention;

DETAILED DESCRIPTION OF THE PREFERRED EMBODIMENTS

Figure 7A:
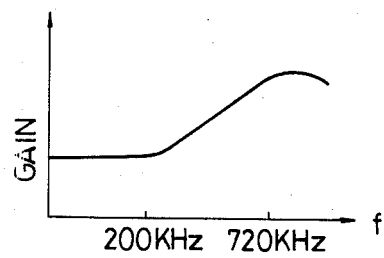
FIGS. 7A and 7B are characteristic curves of an equalizer of FIG. 6.
Figure 7B:
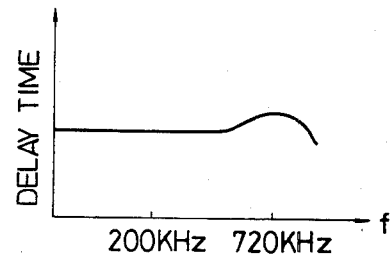

FIG. 6 is a circuit diagram of an embodiment of the present invention, in which a reproduction signal from a pick-up is amplified by a reproduction amplifier 1 and then inputted to an equalizer 17. The equalizer 17 has frequency compensation characteristics for the recording medium, etc. as shown in FIG. 7. That is, the frequency-gain characteristics and the frequency-delay characteristics thereof are as shown in FIG. 7A and FIG. 7B, respectively. As will be clear from those characteristic curves, the delay characteristic is flat up to about 1 MHz and the amplitude at the maximum fundamental EFM signal frequency of 720 KHz is larger than that at the minimum fundamental frequency of 196 KHz by about 6 dB. The equalizer 17 is constituted of a phase shifter and a high frequency enhanced amplifier (see FIG. 10). Other equalizer structures may of course be possible.

Figure 1:
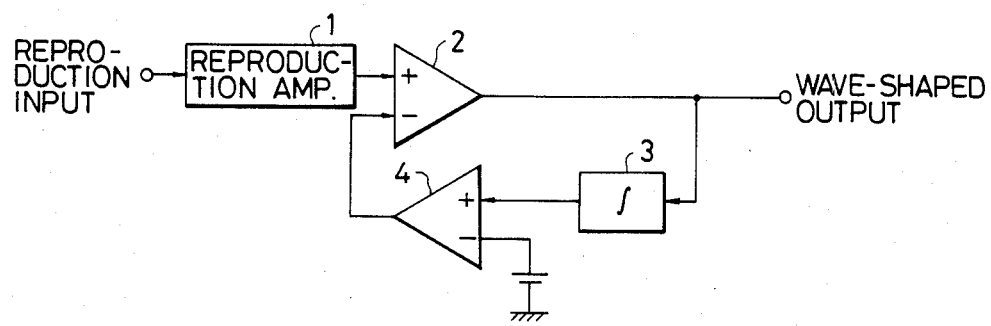
FIG. 1 is a block circuit diagram of an example of an ATC circuit.
Figure 2A:
FIGS. 2a, 2b, and 2c illustrate waveforms for an explanation of the operation of the circuit of FIG. 1.
Figure 2B:
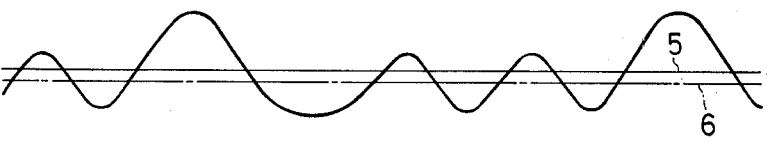
Figure 2C:
Figure 3:
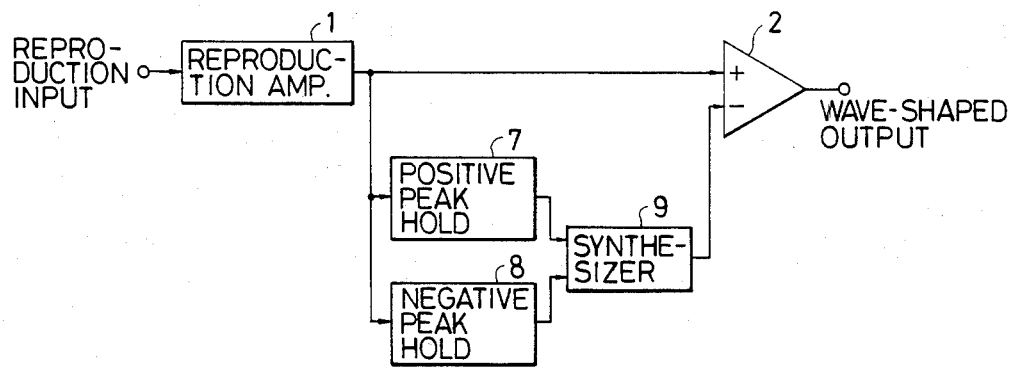
FIG. 3 is a block diagram of another example of the ATC circuit.

By passing the reproduction signal through the equalizer 17, the differences in amplitude due to the reproduction signal frequency can become substantially uniform and thus the circuit is stabilized with respect to the noise component in the amplitude direction. An output of the equalizer is used as an input to a level comparator 2 which constitutes the ATC circuit. The time ratio of the high to low levels of the comparison output is detected by a combination of an integrator 3 and a differential amplifier 4, as in the case shown in FIG. 1. A signal corresponding to the d.c. level of the time ratio detection output, i.e., the output of the amplifier 4, is used as one input to a synthesizer 18.

On the other hand, the positive and negative peak values of the output of the equalizer 17 are detected by peak-hold circuits 7 and 8, respectively, and inputted into a synthesizer 9 for processing (addition). The processed outputs of the peak-hold circuits constitute the intermediate voltage level of the positive and negative peaks of the reproduction signal and are added to the time ratio detection output in the synthesizer 18. A resultant synthesizer output signal is used as the comparison level of the level comparator 2.

Figure 8A:
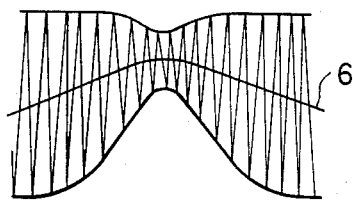
FIGS. 8A and 8B are waveform diagrams explaining the effects of the present invention.
Figure 8B:
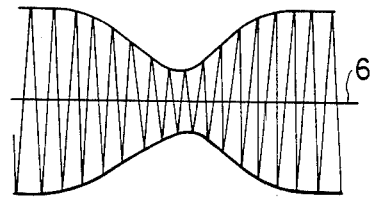

With this arrangement, the output level of the equalizer 17 becomes substantially uniform regardless of the signal frequency and thus the addition output from the synthesizer 9 represents the intermediate voltage level of the positive and negative peaks of the reproduction signal. This means that the time constant of each peak-hold circuit can be large enough to trace drop-out rather than small enough to trace the peaks of the reproduction RF signal. Therefore, the comparison level of the level comparator 2 does not vary with the RF signal frequency dependent amplitude variation and a stable threshold value is obtainable. For the lowering of the level due to drop-out, etc., the threshold level is controlled by the intermediate level detection output from the combination of the peak-hold circuits 7 and 8 and the synthesizer 9. For variations of the high to low level time ratio over a long time, the threshold level is controlled by the time ratio detection output from the combination of the integrator 3 and the differential amplifier 4. Therefore, the threshold level 6 can trace the drop-out phenomenon as shown in FIG. 8A, resulting in effective wave-shaping of the reproduction signal.

Figure 9:
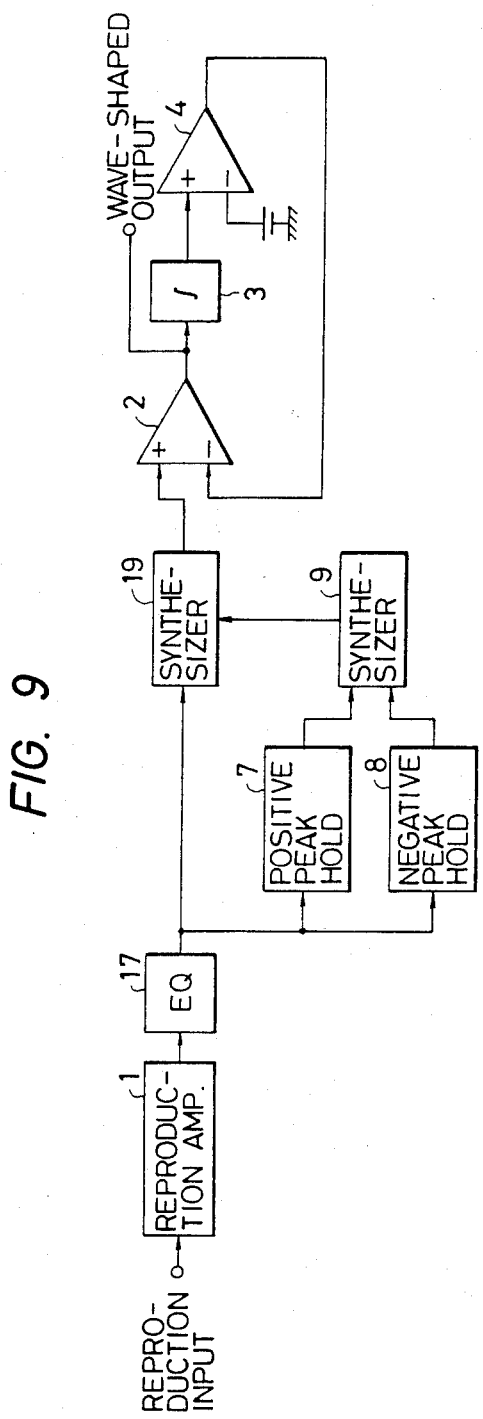
FIG. 9 is a circuit diagram of another embodiment of the present invention.

FIG. 9 is a circuit diagram of another embodiment of the present invention, in which components similar or identical to those in FIG. 6 are depicted by the same reference numerals, and thus a detailed explanation thereof are omitted. In this embodiment, the synthesized output from the combination of the peak-hold circuits and the synthesizer 9, i.e., the intermediate voltage level of the reproduction output, is combined, in another synthesizer 19, in a desired manner with the reproduction output from the equalizer 17, and the resultant synthesized signal is used as a level comparison input to the ATC circuit. In the synthesizer 9, the intermediate voltage level of the positive and negative peak values of the reproduction output signal is detected as in the case shown in FIG. 6. The offset amount of the equalizer output is compensated by the intermediate voltage level so that when the amplitude is reduced due to drop-out, etc., the intermediate level of the reproduction signal is lowered to substantially the same level as that in the usual operation. Therefore, the synthesizer 19 may be constructed as a reduction (difference) circuit. Thus, a stable wave-shaping output is always obtained regardless of drop-out. As to the variation of the time ratio over a long period, the ATC circuit including the integrator 3 and the differential amplifier 4, etc. operates effectively as in the case of FIG. 6.

Alternatively, a similar effect may be obtained by constructing the synthesizer 19 as an addition circuit and inverting the phase of the output of the equalizer 17 or the synthesizer 9.

Figure 10:
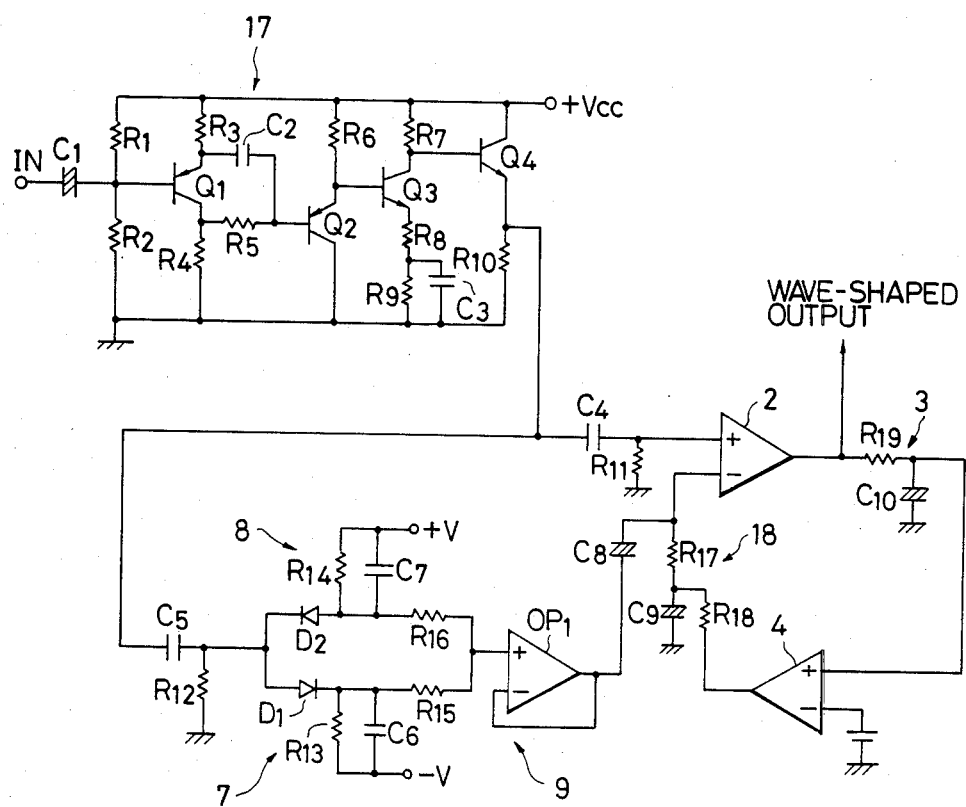
FIG. 10 is a circuit diagram corresponding to the block diagram of the circuit of FIG. 6.

FIG. 10 shows the circuit of FIG. 6 in more detail. In FIGS. 6 and 10, similar or identical components are again depicted by the same reference numerals. The equalizer 17 is constructed by transistors $Q_1$-$Q_4$, capacitors $C_1$-$C_3$ and resistors $R_1$-$R_{10}$. The transistor $Q_1$, the capacitor $C_2$ and the resistors $R_3$-$R_5$ constitute a phase shifter whose gain is 1 and which functions to vary only the phase, and the transistor $Q_3$, the capacitor $C_3$ and the resistors $R_7$-$R_9$ constitute a high region enhancement amplifier. An output of this equalizer is supplied through a coupling circuit composed of the capacitor $C_4$ and a resistor 11 and a coupling circuit composed of the capacitor $C_5$ and a resistor 12 to the level comparator 2 and the peak-hold circuits 7 and 8, respectively. The time constants of these coupling circuits are common so that similar response waveforms can be obtained.

The positive peak-hold circuit 7 is composed of a diode $D_1$, a resistor 13 and a capacitor $C_6$ and the negative peak-hold circuit 8 is composed of a diode $D_2$, a resistor $R_{14}$ and a capacitor $C_7$. Hold outputs of these circuits are summed in an adder 9 composed of resistors $R_{15}$ and $R_{16}$ and an operational amplifier $OP_1$, and the resultant sum is supplied to an input of a synthesizer 18 in a subsequent stage. The synthesizer 18 is composed of capacitors $C_8$ and $C_9$ and resistors $R_{17}$ and $R_{18}$. An output of the differential amplifier 4 of the ACT circuit is supplied to the other input of the synthesizer. As seen from the side of the adder 9, the time constant of a circuit including the resistor $R_{18}$ and the capacitor $C_9$ is sufficiently large, and the coupling time constant of the output of the adder 9 is substantially determined by the capacitor $C_8$ and the resistor $R_{17}$. The so-called pole produced by the resistor 17 and the capacitor $C_8$, when seen from the side of the ATC circuit, is made outside of the frequency band of the ATC circuit and negligible by suitably selecting the values of these elements. As mentioned before, the discharge time constants ($C_6.R_{13}$ and $C_7.R_{14}$) of the respective peak-hold circuits 7 and 8 are selected such that although these circuits can trace drop-out, they cannot always trace the respective peaks of the RF signal so that the usual random noise in the threshold level becomes a minimum. The integrator 3 of the ATC circuit is constituted of a resistor 19 and a capacitor $C_{10}$.

In either of the embodiments of FIGS. 6 and 9, it may be possible to insert a delay circuit into the RF signal line, i.e., the output line of the equalizer, to thereby compensate for delays due to the time constants of the positive and negative peak-hold circuits.

As described hereinbefore, according to the present invention, the threshold level can be traced and controlled effectively against level lowering of the RF signal, such as drop-out, and the threshold level is always stable in normal operation without random variation. Therefore, it is always possible to obtain an exact reproduction (waveform) output. Further, during a fast feed information search, in case of the drop-out phenomena or level lowering of the RF signal which can occur when the information detection point passes across recording tracks, the threshold level is capable of tracing and thus it is possible to reproduce the RF signal.

What is claimed is:

1. A reproduction reading device for reading out a waveshaped output signal corresponding to an inputted digital information reproduction signal, said reproduction signal having been recorded on a recording medium or transmitted into a transmission medium, with reproduction being performed according to a modulation system in which the time ratio of the high level signal duration to the low level signal duration is substantially unity, comprising: comparator means for comparing the level of a reproduction output signal derived from the inputted reproduction signal, with a feedback comparison level signal, time ratio detecting means for detecting the time ratio of the high level signal duration of a comparator output of said comparator means to the low level signal duration of the same, intermediate level detecting means for detecting substantially an intermediate value of respective positive and negative peak values of said reproduction output signal, and means for adding the outputs of said time ratio detecting means and said intermediate level detecting means to provide an output constituting said feedback comparison level signal; wherein said waveshaped output signal is outputted from said comparator means.

2. A device as claimed in claim 1, said time ratio detecting means comprising means for detecting a direct current component of the output of said comparator means and providing a detection output corresponding to the level of the direct current component.

3. A device as claimed in claim 1, wherein said intermediate level detecting means comprises an equalizer circuit for compensating said inputted reproduction signal for frequency characteristics and means for holding positive and negative peak values of an output of said equalizer circuit and for adding them in a desired manner.

4. A reproduction reading device for reading out a waveshaped output signal corresponding to an inputted digital information reproduction signal, said reproduction signal having been recorded on a recording medium or transmitted into a transmission medium with reproduction being performed according to a nodulation system in which the time ratio of the high level signal duration to the low level signal duration is substantially unity, comprising: control means for controlling the amplitude of an offset signal combined with a reproduction output signal derived from the inputted reproduction signal, according to an intermediate level of respective positive and negative peak values of said reproduction output signal, wherein said control means has an output, comparing means for comparing said control means output with a feedback comparison level signal, and time ratio detecting means for detecting the time ratio of the high level signal duration of an output of said comparing means to the low level duration of the same and for controlling said feedback comparison level signal according to the detected time ratio, wherein said comparing means output corresponds to said waveshaped output signal.

5. A device as claimed in claim 4, wherein said time ratio detecting means comprises means for detecting a direct current component of the output of said comparing means and for providing a detection output corresponding to the level of the direct current component.

6. A device as claimed in claim 4, wherein said intermediate level detecting means comprises an equalizer circuit for compensating said reproduction output signal for frequency characteristics and means for holding positive and negative peak values of an output of said equalizer circuit and for adding them in a desired manner.

* * * * *